United States Patent [19]

Breisch

[11] 4,124,093

[45] Nov. 7, 1978

[54] WORK-SUPPORTING DEVICE

[75] Inventor: John H. Breisch, Lakewood, Ohio

[73] Assignee: Jonvin Corporation, Cleveland, Ohio

[21] Appl. No.: 774,337

[22] Filed: Mar. 4, 1977

Related U.S. Application Data

[63] Continuation-in-part of Ser. No. 591,429, Jun. 30, 1975, Pat. No. 4,014,405.

[51] Int. Cl.[2] .............. F16M 11/00

[52] U.S. Cl. .............. 182/181; 182/46; 182/224

[58] Field of Search .............. 182/181-185, 182/224, 225, 227, 46; 248/460, 465, 165, 150

[56] References Cited

U.S. PATENT DOCUMENTS

| | | | |
|---|---|---|---|
| 144,334 | 11/1873 | Haarvig | 24/230 |
| 320,674 | 6/1885 | Murray | 182/184 |
| 978,403 | 12/1910 | Schott | 182/186 |
| 1,462,707 | 7/1923 | Lawlor | 182/181 |
| 2,281,039 | 4/1942 | Jones | 182/182 |
| 2,427,540 | 9/1947 | Wierowski | 182/182 |
| 3,456,100 | 7/1969 | Green | 256/64 |
| 3,704,849 | 12/1972 | Green | 182/181 |
| 3,950,873 | 4/1976 | Stehle | 256/64 |
| 4,014,405 | 3/1977 | Breisch | 182/46 |

*Primary Examiner*—Reinaldo P. Machado
*Attorney, Agent, or Firm*—Bosworth, Sessions & McCoy

[57] ABSTRACT

A work-supporting device such as a sawhorse that is light and strong and which can be easily assembled and knocked down into a compact form without requiring any screws, bolts, clamps or similar fastening devices. The sawhorse has a cross beam with vertical, rectangular, hollow recesses extending from its bottom side into which at least two pairs of legs may be inserted. The legs are shaped so as to provide a wedging fit within the recesses and an interlock is also provided between the legs and the cross beam so that the legs remain securely in place, although they can be readily inserted and removed. The sawhorse preferably is made from a structural foam thermoplastic material having sufficient strength that the sawhorse is capable of supporting heavy loads. The material will not rot, splinter, warp or rust. The legs may be arranged to support horizontal shelves if desired and the cross beam into which the legs are inserted may be made in different shapes to suit different purposes, for example, to constitute a sawbuck.

37 Claims, 9 Drawing Figures

FIG. 1
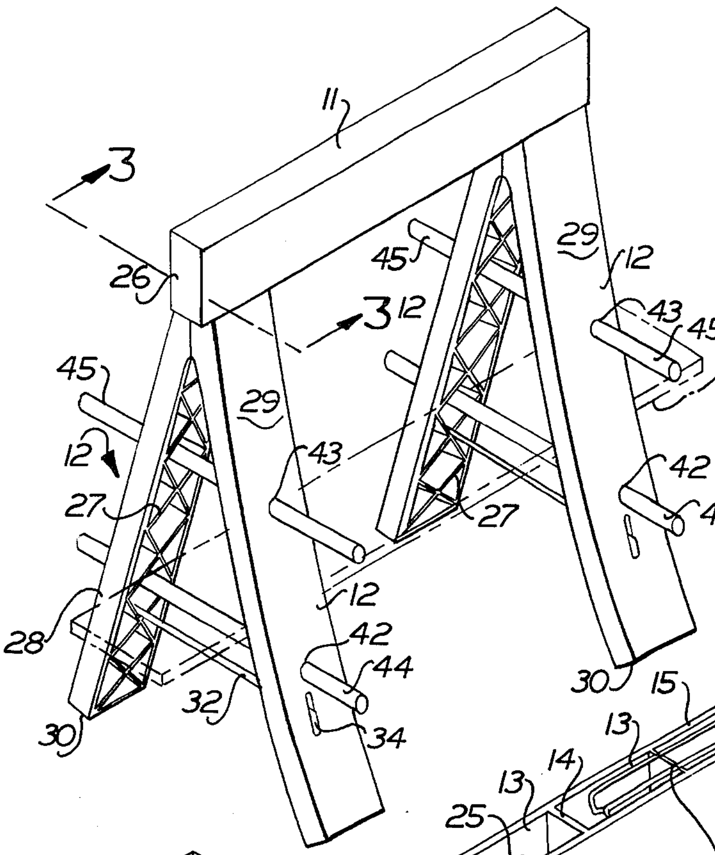
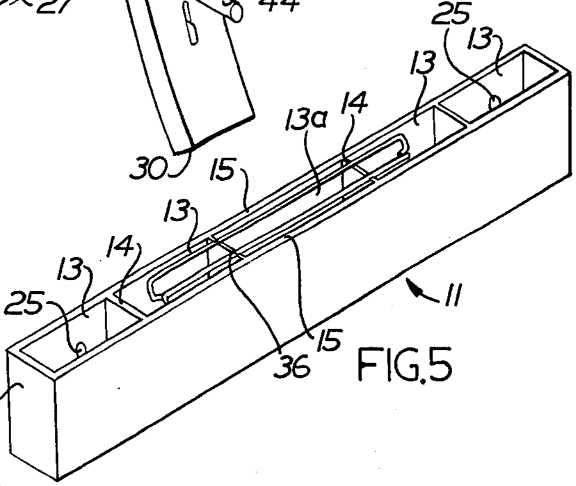
FIG. 5
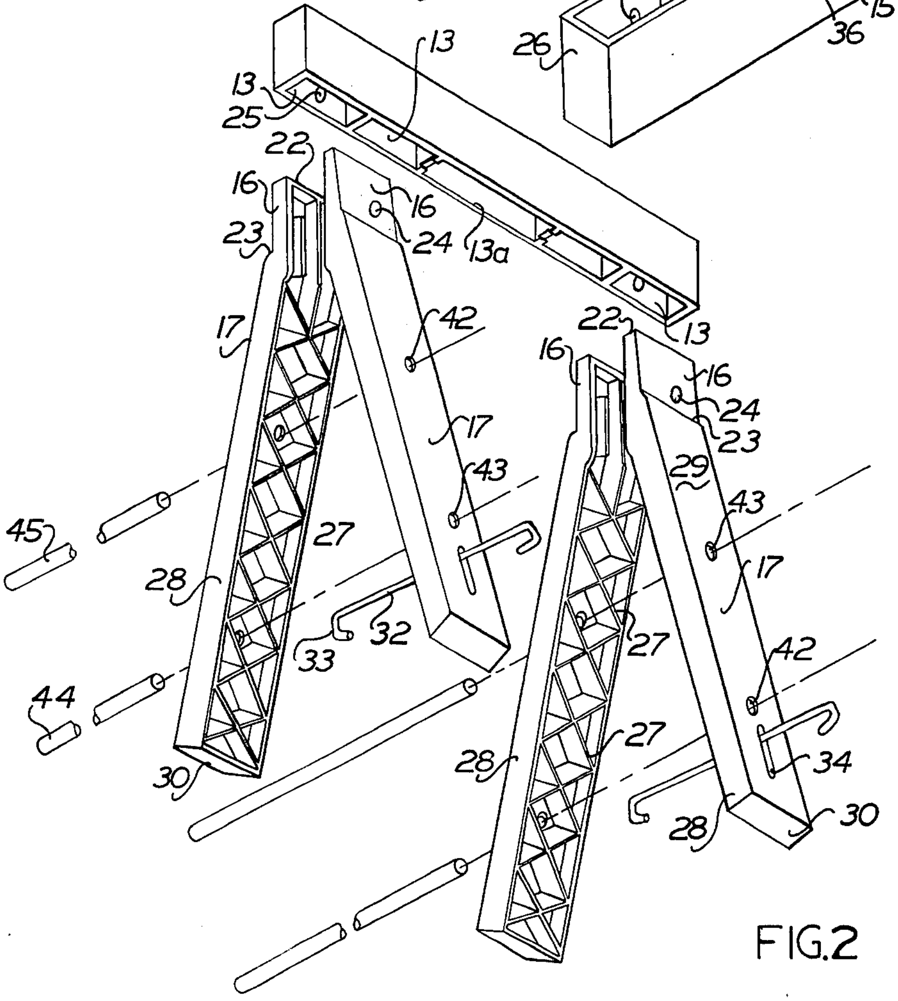
FIG. 2

WORK-SUPPORTING DEVICE

CROSS REFERENCE TO RELATED APPLICATION

This application is a continuation-in-part of my co-pending application Ser. No. 591,429, filed June 30, 1975, now U.S. Pat. No. 4,014,405.

BACKGROUND OF THE INVENTION

This invention relates to portable work-supporting devices such as sawhorses and the like and more particularly to devices of this character which can be knocked down to a compact form for shipment and storage and which can be easily assembled. Sawhorses, sawbucks and the like are widely used for various purposes. They are used in the construction field and in the home and in businesses to provide temporary supports for various materials and supplies, and in making scaffolds as by supporting a platform on a pair of sawhorses. They are used in the form of sawbucks to support workpieces. They are widely used as barricades on highways and parking areas and in crowd control. They are frequently used in temporary locations so that easy portability is important. In many instances they are stored between periods of use and it is important that they be capable of easy disassembly and assembly so that they can be stored compactly. Since they are frequently exposed to weather and rough service, they should be capable of withstanding inclement weather without damage and without corrosion. They should also be of material that is hard enough to resist damage by impacts that are likely to be encountered in use and that will resist splintering.

Sawhorses consisting of a horizontal wooden beam to which two pairs of diverging wooden legs are secured by nailing the upper portions of the legs to the beam have been widely used in the past. Such sawhorses cannot easily be knocked down. Sawhorses that can be knocked down have been made in which the legs are attached to the horizontal beams by means of bolts, screws, clamps or special brackets. These can be taken apart but not very easily and the clamps, bolts or screws that hold the sawhorses together were frequently lost or misplaced. Sawhorses of this character have beem made of wood, which is subject to splintering, warping and rotting, and of metal, which may rust and corrode and otherwise require protective coatings. The necessity for securing parts of the sawhorse together by screws, bolts or clamps makes them inconvenient to assemble or disassemble.

SUMMARY OF THE INVENTION

A general object of the present invention is the provision of improved work-supporting devices such as sawhorses and the like in which the above noted problems are overcome. Another object of the invention is the provision of a supporting device such as a sawhorse or the like which can be easily disassembled and assembled and which, when assembled, will not accidently come apart in ordinary use. A further object is to provide such a sawhorse or the like which can be assembled without requiring bolts, screws, brackets or other separate attaching devices.

Further objects include the provision of supporting devices such as sawhorses and the like which are light and compact when knocked down, yet capable of supporting heavy loads when assembled, which will not rot, splinter, warp, rust or corrode and which will require no separately applied protective coating.

According to the present invention these and other objects are accomplished by the provision of a supporting structure comprising a horizontal cross beam and two pair of legs. The beam has at least two vertical, rectangular, hollow recesses extending into the interior of the beam from the bottom thereof. The upper ends of the legs are wedge shaped and when two legs are combined into a pair the upper ends provide a wedge shape that is removably inserted into one of the hollow recesses on the under side of the cross beam. In order more securely to retain the legs in the recesses, the legs and the walls of the recesses are provided with interlocking portions such as a small recess on the outer surface on the upper end of each leg that is engaged by a correspondingly located projection on the inner surface of the wall of the recess in the cross beam. This construction ensures that the legs will not be accidently displaced from the cross beam although they may be removed from the cross beam without requiring under force. Each device includes at least two pairs of legs firmly engaged within a recess on the bottom of the cross beam.

A strong, solid, yet light and portable construction is obtained by constructing the supporting devices from a moldable plastic material. Such materials are not subject to rot, warping or rust like wood or metal and do not require a protective coating. The plastic material can be molded readily to provide the recesses in the horizontal cross beam and the required interfitting of the pairs of legs and the recesses. The plastic material is sufficiently deformable under stress to provide for the wedging frictional engagement of the legs which, in combination with the interengaging parts, assures a strong and sturdy assembly.

BRIEF DESCRIPTION OF THE DRAWINGS

FIG. 1 is a perspective view illustrating an assembled sawhorse made according to a preferred form of the invention;

FIG. 2 is an exploded perspective view of the sawhorse of FIG. 1;

FIG. 5 is a perspective view to an enlarged scale, showing the under side of the horizontal beam of the sawhorse of FIGS. 1 and 2;

DESCRIPTION OF PREFERRED EMBODIMENTS

Figure 3:
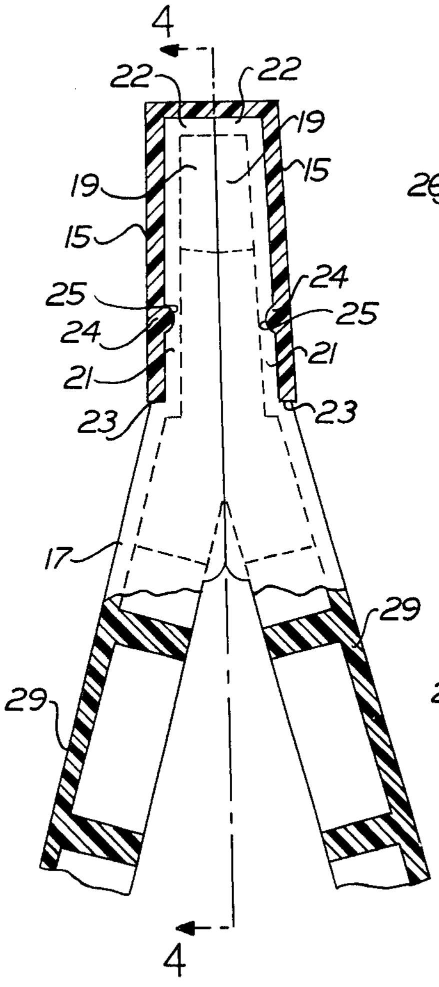
FIG. 3 is a section to an enlarged scale, taken as indicated by line 3—3 of FIG. 1.
Figure 4:
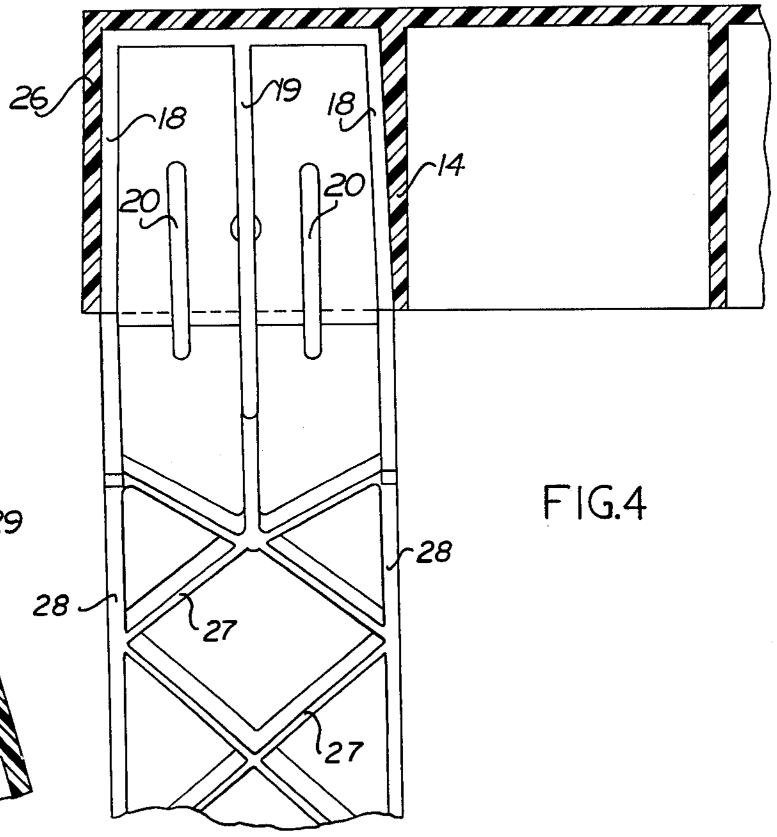
FIG. 4 is a section to the same enlarged scale, taken on line 4—4 of FIG. 3.

As shown in FIG. 1, a sawhorse made according to a preferred form of the invention comprises a horizontal cross beam 11 into which two pairs of legs 12 are inserted. As shown in FIGS. 2 and 5, the under side of the cross beam 11 is provided with a plurality of rectangular, hollow recesses 13 which extend into the beam from the under side thereof. At least two of the recesses 13, such as the recesses at the ends of the beam, are dimensioned to receive the upper ends of a pair of legs 12. If desired and particularly if the beam is made of a greater length, additional pairs of legs can be inserted into recesses along the bottom of the cross beam 11 in order to provide additional support between the ends of the beam. Also, it is to be noted that the legs are not necessarily inserted at the ends of the beam since, for some purposes, it may be desirable to have end portions of the beam project beyond the legs.

Because of the recesses 13, the interior of the beam is hollow, thus the weight of the beam is reduced and the cost of the material employed in the beam is correspondingly reduced. The partitions 14 between the recesses 13 reinforce the structure and prevent buckling of the side panels 15 of the beam under load. The structure thus makes efficient use of its materials and a strong and light beam results. While the beam shown in FIGS. 1, 2 and 5 embodies four recesses 13 and an elongated central recess **13*a***, it is to be understood that the cross beams can be made to any desired length. Short cross beams may be desirable or advantageous for certain uses and long cross beams may be advantageous in other situations.

In order to provide for economical manufacture as well as ease of assembly, the legs 12 are all identical. Each leg has a wedge-shaped upper portion 16 that is generally vertical when the sawhorse is assembled, and a lower portion 17 that extends downwardly at an obtuse angle from the upper portion 16. As shown in FIGS. 2 and 3, the upper portion 16 has an inner side defined by outer side walls 18, a central web 19 and intermediate webs 20. The inner end surfaces of the side walls 18 and the webs 19 and 20 lie in the same plane, which is vertical when the sawhorse is assembled. The end of each leg also has a flat outer surface 21. The surface 21 is not parallel to the plane defined by the outer side walls 18 and the webs 19 and 20 but is angled slightly so that the outer surface of the upper portion 16 slopes slightly outwardly from its upper end 22 to a shoulder 23 at the juncture of the upper portion 16 and the lower portion 17. Thus, when a pair of legs 12 are combined and the vertical surfaces of side walls 18 and webs 19 and 20 of each leg of the pair was flush against each other, the upper portions 16 combine to form a slightly tapered or wedge-shaped assembly; that is, the width of the combined upper portions 16 measured at the upper ends 22 is less than the width of the combined upper portions measured just above the shoulders 23.

In order to ensure that the legs 12 are securely held in the cross beam 11 when the sawhorse is assembled, each recess 13 in the cross beam is made with parallel side walls and is dimensioned to fit snugly the wedge-shaped combined portions 16 of a pair of legs 12 as shown in FIG. 3. As the wedge-shaped under portions are pushed into the recesses, the walls of the recesses are deflected slightly by the wedge shape of the upper portions 16, ensuring a tight fit. The legs fit more tightly as they are forced further into the cross beam recesses 13, movement of each leg into its corresponding recess 13 being limited by the shoulders 23 on the legs.

Under ordinary circumstances and with legs and recesses of proper dimensions, the wedge fit ensures that the legs will be retained properly in the cross beam when the sawhorse is moved about in assembled form without requiring any additional bolts, screws, clamps or other securing means. The wedging action also holds the legs in proper position with respect to the beam and the tight friction fit of the legs within the recesses prevents wobbling of the legs under load.

However, in order to make doubly sure that the legs are properly retained within the beam when the sawhorse is assembled, the exterior surfaces of the upper portions of the legs and the adjacant interior surfaces of the recesses into which they fit are provided with interengaging parts to provide an additional interlock between the beam and the legs.

To this end, as shown in FIGS. 2 and 3 the upper portions 16 of each leg are preferably provided with indentations 24 aligned with the central webs 19 of the legs to give additional support to the surface adjacent the indentations. The recesses 13 that receive the legs are provided with corresponding projections 25 that are shaped to conform to the indentations 24 and located so that they coincide with the indentations 24 when the beam 11 rests on the shoulders 23 of the legs, the legs being centered with respect to the recesses 13 by the intermediate partitions 14 and the end walls 26 of the beam. With this arrangement, the projections 25 fit within the indentations 24 as shown in FIG. 3. This engagement is amply sufficient to prevent the legs from accidently being dislodged from the beam when the sawhorse is being moved but the material of the beam and the legs is sufficiently flexible that it can deflect enough to permit the legs to be pulled out of the beam, one at a time, without requiring undue force.

In order to provide light yet strong legs, each leg 12 takes the form of a hollow channel section that is reinforced for increased strength and stiffness. Preferably the reinforcements comprise diagonal struts or webs 27 that are molded integrally with the side walls 28 and outer surfaces 29 of the lower portions of the legs 17. The parallel, vertical webs 19 and 20 reinforce the upper portions 16 of the legs and, as noted above, these webs engage corresponding webs of adjacent legs when the legs are assembled in pairs, see FIG. 3. It will be noted that the webs 19 of each leg provide a support beneath the surface adjacent the indentations 24 to ensure that a firm engagement will be made between the projections 25 and the indentations 24. While it is preferred that the webs 27 take a diagonal form and the webs 19 and 20 extend vertically, it is to be understood that other forms of integrally molded reinforcements could be employed.

As mentioned above, the legs are preferably integrally molded of a plastic material. The configuration of the legs with straight side walls and a flat outer wall in combination with the diagonal reinforcements provides an unexpected and unobvious advantage. The legs are formed in molds that define the outer surfaces 29 of the legs as plane, the molds being straight. However, when the molded plastic material is removed from the molds and permitted to cool, the continuous plane outer surface 29 of the legs shrinks to a greater extent than the diagonally reinforced portions of the legs remote from the outer surface 29. The result is that the completed legs, after curing, have an outer surface 29 that is slightly concave in the direction of the length of the legs. This concavity is greatly exaggerated as illustrate in the drawings, being for example, about one-eighth inch in a leg having a lower portion 17 of about $24\frac{1}{2}$ inches long measured from the shoulder 23 to the lower end 30 of the leg. With the legs concave as described, when the sawhorses are subjected to heavy loads the legs tend to bow inwardly slightly and if the inward bowing becomes readily noticeable, the user is warned that the load on the sawhorse may be excessive.

Attention is directed to the fact that in the preferred form of the invention, the lower end 30 of each leg extends in a plane perpendicular to the longitudinal axis of the leg. This is advantageous particularly when a sawhorse is supported on earth or other yielding surfaces because the contact between the legs and the surface takes place at the inner corners of the bottoms of the legs and the legs thus have a tendency to dig into the surface enabling the legs to resist spreading under load to a greater degree than if the legs were shaped to present a flat surface to the support.

When used under heavy loads and particularly on smooth or slippery surfaces, the lower portions 17 of the legs are subjected to forces that tend to spread them apart at the bottom. To counteract this, cross braces 12 may be employed. These braces may be readily fabricated from metal rod formed with hooks 33 at each end. Each brace 32 can be removably attached to the legs of a pair by any conventional method; preferably the braces 32 are attached to the lower portions 17 of the legs as shown in FIGS. 1 and 2 and as described in greater detail in my aforesaid parent U.S. Pat. No. 4,014,405. To provide for securing the braces 32 to the lower portions of the legs, each lower portion 17 has a slot 34 and a hole immediately beneath the slot in the center of the lower portion of the leg a few inches up from the bottom. The brace 32 is installed by inserting the hook 33 through the slot 34, then the end of the hook is extended toward the inside of the leg through the hole beneath the slot so that the hook engages the adjacent reinforcing web or strut 27. The opposite end of the reinforcing member is then inserted in the same manner into the slot on the opposite leg of the pair of legs. This provides a tension brace between the lower portions of the legs that resists the tendency of the legs to spread and increases the load that can be imposed directly on the sawhorse. The brace can be readily removed by moving the lower portions of the legs toward each other, thus displacing one of the hooks from engagement with its associated strut; the hook is then lifted upwardly in the slot so that the hook can be disengaged from the strut 27 and removed from the slot. Then the hook at the other end of the brace can be similarly removed.

Preferably the slot is situated on the lower portion 17 of each leg so that when the hook is in position the end of the hook engages at the intersection of two reinforcing struts 27, as indicated in FIG. 1 and as shown in detail in my aforesaid parent U.S. Pat. No. 4,014,405.

To provide convenient and compact storage for the braces 32 when the sawhorse is knocked down, grooves 36 are provided in the partitions 14 of the cross beam 11. As shown in FIG. 5, the grooves are aligned and make a friction fit with the braces so that two braces can be stored longitudinally along the under side of the beam.

It is sometimes convenient to provide shelves for supporting tools or the like underneath the horizontal beam of a sawhorse. This is accomplished readily with the present sawhorse merely by forming holes 42 and 43 through the outer surface 29 of the lower portions of the legs 12. The holes are formed at the same distances from the lower ends 30 of each leg and a support for a shelf can be readily arranged by inserting members such as dowels 44 and 45 through the holes as shown in FIG. 1, the dowels being dimensioned to have a friction fit in the holes. The two dowels 44 can support a horizontal shelf 46 which is shown in broken lines in FIG. 1 and, if desired, a narrower shelf can be supported on the dowels 45 at a higher level. The length of the dowels is not important so long as they are long enough to span the distance between the legs at the levels at which they are located. If shelves are not required, the dowels simply are not placed in the assembly.

Figure 8:
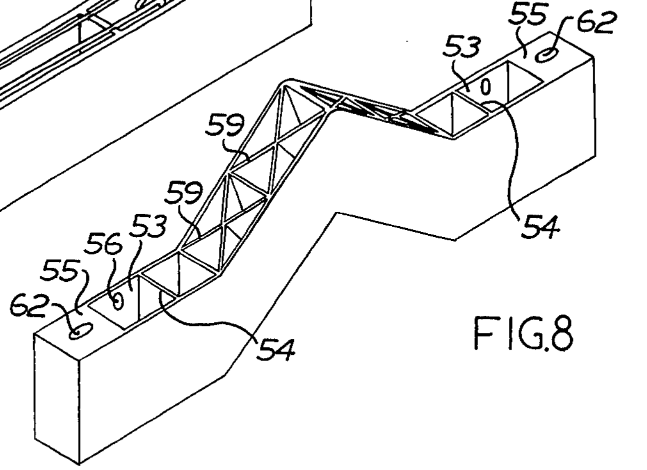
FIG. 8 is a view illustrating the under side of the cross member of FIGS. 6 and 7.
Figure 7:
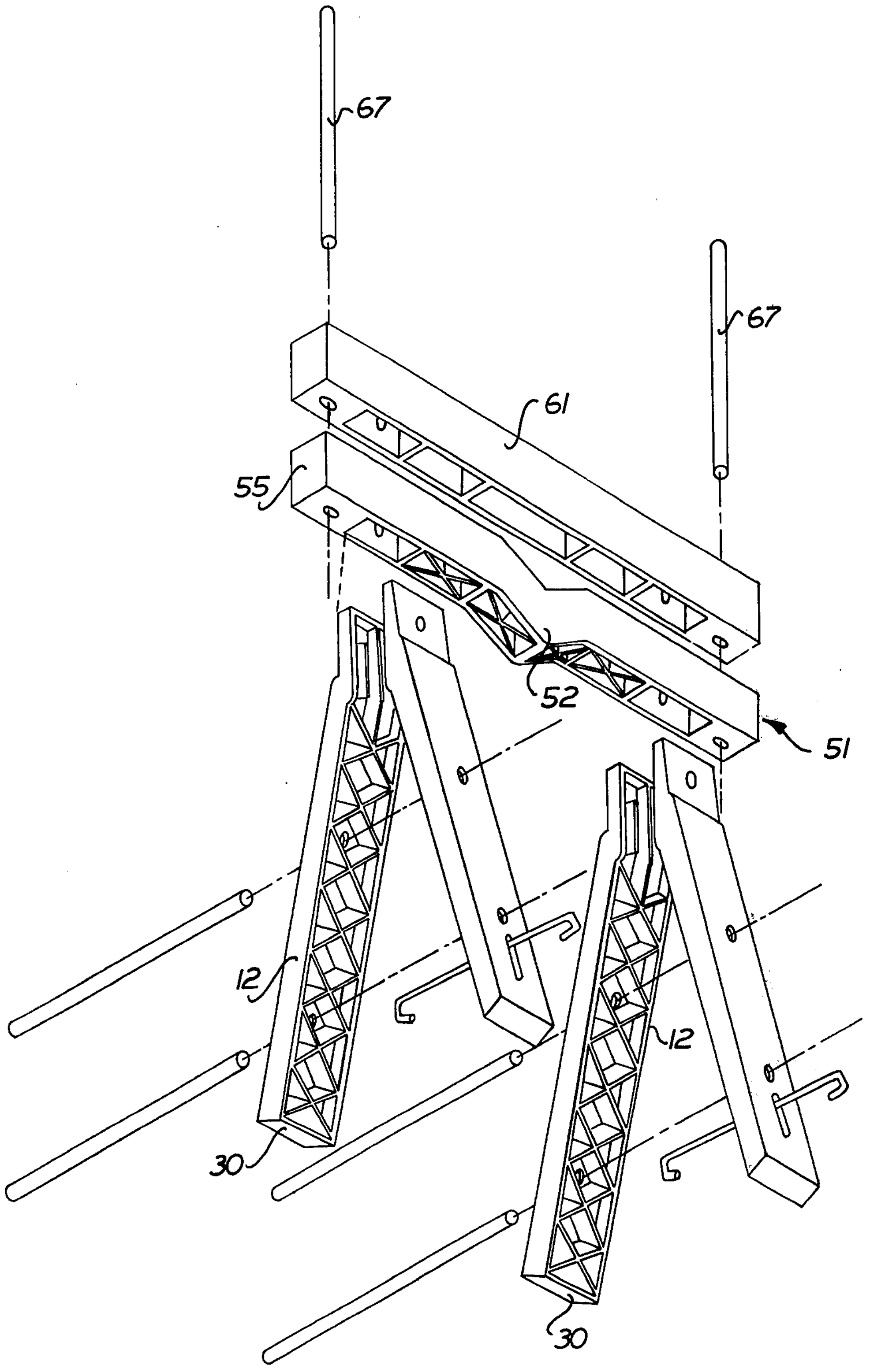
FIG. 7 is an exploded view of the sawbuck of FIG. 6.

The underlying structure of the work-supporting device of the present invention can be adapted to various uses and purposes. For example, if it is desired to provide a sawbuck rather than a simple sawhorse, this can readily be accomplished as shown in FIGS. 6 to 9. In these figures, the legs 12 are constructed as heretofore described and the same reference characters are applied to corresponding parts of the legs, braces and shelf supports in these figures as in the previous figures. In this embodiment of the invention, however, the cross beam 51 instead of being a straight horizontal member, is provided with a depressed, V-shaped central portion 52 which, as shown in broken lines, is adapted to support a log L or other workpiece. As shown in FIG. 8, the under side of the beam 51 is provided near its ends with recesses 53 defined by partitions 54 and end portions 55. The recesses 53 also embody projections 56 which, like the projections 25 in the previous modification, are adapted to engage indentations 24 on the upper portions of the legs 12.

The upper surface 58 of the cross beam 51 is provided with serrations in the V-shaped portion 52 thereof and the under side of the beam 51 is reinforced by diagonal webs 59 that are molded integrally with the beam and function to stiffen and strengthen the structure.

Figure 6:
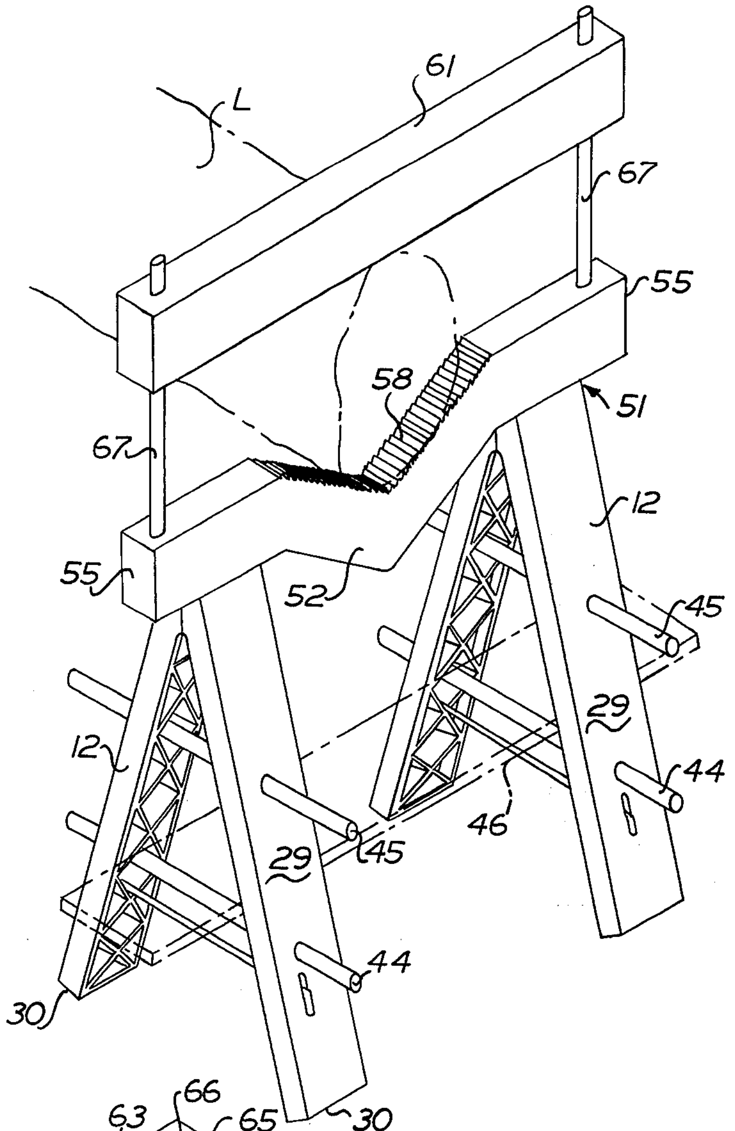
FIG. 6 is a perspective view of a supporting device of the present invention adapted for use as a sawbuck.
Figure 9:
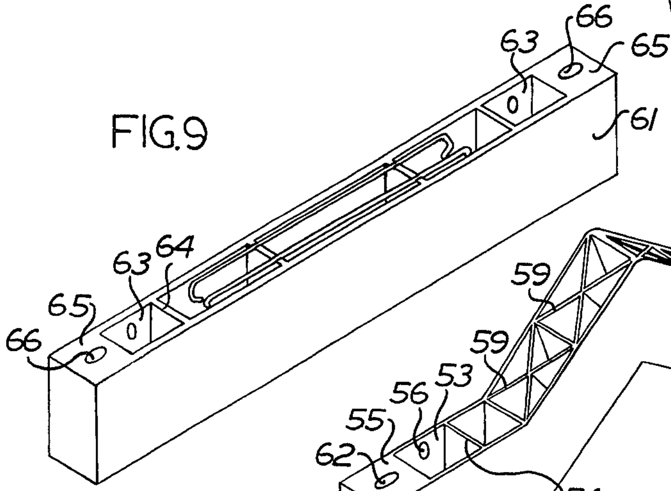
FIG. 9 is a similar view illustrating the under side of a member that may be used as a clamping member with the sawbuck as shown in FIG. 6, or as a horizontal cross beam in a sawhorse embodying the invention.

In order to provide support for a clamping or hold down member 61 that can be employed to hold a workpiece down into engagement with the corrugated surface 58 of the V-shaped portion 52, the ends 55 of the cross beam project beyond the recesses 53 that receive the legs 12. The projecting ends 55 have vertically extending openings 62 therein. Except for its ends, the clamping member 61 is preferably constructed in all material respects like the beam 11 previously described, being provided with recesses 63 defined by webs 64 and corresponding in general to the recesses 13 in the cross beam 11. The clamping member 61, however, has end portions 65 disposed beyond the recesses 63 and these end portions are provided with openings 66 extending vertically through them and spaced horizontally the same distance as the openings 62 in the end portions 55 of the cross member 51. The openings 62 and 66 are dimensioned to make a friction fit with elongated vertical members such as dowels 67 so that as shown in FIG. 6, the hold down member 61 can be urged into engagement with the workpiece L to retain the workpiece in firm engagement with the upper serrated surface 58 of the V-shaped portion 52. The hold down member obviously does not need to be employed unless it is required and it is to be noted that the hold down member, being substantially identical with the horizontal cross beam 11 except for the end portions 55, can be utilized with two pairs of legs, a cross member 51 with a V-shaped central portion and a cross member like the hold down member 61, the user can assemble the parts to provide either a simple sawhorse or a sawbuck. As disclosed in connection with the modification of the invention previously described, the sawbuck may be provided with horizontal braces 32 and dowels 44 and 45 may be utilized to provide supports for a shelf such as the shelf 46 shown in broken lines in the drawings.

It is to be noted that if sawhorses are made with cross beams with projecting ends, like cross member 61, the end portions and the openings therein can be used to support other devices, or to provide for connection of the sawhorses to other sawhorses or other devices as by ropes, chains or brackets.

Assembly of work-supporting devices made according to the present invention is simple. A cross beam 11, 51 or 61 is selected, depending on what is desired, and is turned upside down so that the recesses 13, 53 or 63 face upwardly. A pair of legs 12 are then held together so that the vertical surfaces of side walls 18 of the upper portion 16 of the legs are flush against each other. The pair of legs is then inserted into one of the recesses 13, 53 or 63, as the case may be, and another pair of legs is similarly inserted into another recess 13, 53 or 63 at a spaced location on the cross beam. The combined width of the two legs at their upper ends 22 is such that the pairs of legs can easily be guided into the mouths of the recesses. As the upper portions of the legs are inserted further into the recesses, the tapered shape of the legs causes the fit to become tighter. The projections 25 on the inside walls of the recesses slide along the upper portions of the legs until the projections 25 snap into the correspondingly shaped indentations 24 in the outer surfaces of the upper portions of the legs 12. At this time the shoulders 23 on the legs engage the bottom surface of the cross beam limiting further inward movement of the legs into the recesses. If desired, the last movement of the legs into the recesses can be accomplished by turning the supporting device over to its normal position and applying additional weight to the cross beam.

The snap fit of the projections 25 and indentations 24 as well as the tapered construction of the upper portions 16 of the legs insures that the legs will be firmly retained in position against accidental displacement in use. However, the devices can be quickly and easily knocked down by turning them upside down and pulling upwardly upon the legs, the easiest way to do this being to pull upwardly upon one leg at a time, thereby removing one of the legs in a pair from a recess, after which the other leg can be removed easily.

In order to provide work-supporting devices of the type described, which are light in weight yet strong enough to support heavy loads, the devices are preferably molded from a plastic material. Structural foam plastics are preferred materials since they have a relatively low specific gravity, yet are able to withstand substantial compressive and tensile forces. As used herein, a structural foam plastic material is defined as a material comprising a combination of plastic resins and any conventional blowing or foaming agent which can be molded using any conventional plastic injection molding process to produce a rigid plastic part of the desired configuration which has a relatively low specific gravity. It will be noted that the shape of the components of the devices of the present invention is such that they can readily be molded by conventional methods and apparatus.

For the sawhorse to be sufficiently light and portable, the plastic material should have an overall specific gravity of between 0.5 and 0.95. To support heavy loads comparable to a similarly dimensioned wood sawhorse, the material should be able to withstand a compressive or tensile stress of at least 1,000 psi, and have a flexural modulus of at least 7,500 psi.

Other important properties to consider in choosing a suitable structural foam plastic material are a solid integral skin with a cellular core to provide a durable and attractive outer surface, the ability to withstand environmental elements such as moisture and a range of ambient temperature which might cause deterioration of metal or wood, and the ability to withstand substantial impact without fracture.

Suitable structural foam plastics which have the desired properties include those made of the following resins: polyolefins such as polypropylene, polyethylene, polyvinyl chloride, nylon, and related copolymeric resins.

Structural foam polyolefins such as polypropylene are a preferred thermoplastic material. Foam polyolefins can be injection molded into irregular shapes using any conventional injection molding technique with chemical or gaseous blowing agents. A major advantage of polyolefins in molding structural foam material is that they can produce the lowest density of any of the high stiffness structural resins of which I am aware. They are also heat resistant and tough at low temperatures. Foam polyolefins form a solid integral skin with a cellular core. High density polypropylene foam has a typical specific gravity of 0.68 to 0.72. It also has a typical compressive strength of 1,400 to 1,600 psi, a typical tensile strength of 1,800 to 2,000 psi, and a flexural modulus of 95,000 to 105,000 psi. Suitable foam polypropylene materials are currently available under the commercial designations of Exxon 805 HC made by Exxon Chemical Company, Eastman 4E31A, made by Eastman Chemical Products, Inc., Amoco 10-6317 made by Amoco Chemicals Corporation, and Shell 7625 made by Shell Chemical Company.

Another suitable material is structural foam polyethylene. Either high or low density polyethylene resin may be used. High density foam polyethylene, for instance, has a typical specific gravity of between 0.72 and 0.77, a compressive strength of around 1,300 psi, a tensile strength of around 1,300 psi, and a flexural modulus of around 100,000 to 120,000 psi. Foam polyethylene can also be injection molded into irregular shapes with a solid integral skin.

Various foam vinyls can be used, such as rigid cellular polyvinyl chloride. Rigid cellular vinyl has properties very close to those of wood and may be injection molded into desirable shapes. A typical specific gravity of rigid cellular polyvinyl chloride is about 0.9, a typical compressive strength is 4,000 to 5,000 psi, a typical tensile strength is also 4,000 to 5,000 psi, and a typical flexural modulus is 200,000 to 250,000 psi.

Nylons may also be foamed and molded. Nylon is particularly resistant to environmental wear and corrosion. A specific gravity of 0.75 to 0.86, with a compressive strength of 7,000 to 9,000 psi, a tensile strength of 7,000 to 9,000 psi, and a flexural modulus of 200,000 to 250,000 psi is possible with foam nylon.

Other plastic materials that may be used include acrylonitrile-butadiene-styrene copolymers, polyethylene and polypropylene and copolymers thereof, polyurethane, polystyrene, polypropylene, polycarbonate, thermoplastic polyesters, thermosetting polyesters and all of the foregoing with reinforcing agents such as fiber glass or other fillings added to them to increase their strength.

By the proper selection of a suitable plastic material for the components, work-supporting devices can be built having load bearing characteristics similar to wood and metal yet without the disadvantages of wood or metal. The plastic material will not rot, splinter, or warp like wood, or rust or corrode like metal, and it requires no additional protective coating. Reflective tape or other reflective devices can be easily applied to the exterior plastic surfaces if the sawhorses are to be used as barricades or the like. In addition, the wedge-type, snap-in construction of the present invention can be more advantageously utilized with plastic materials than with wood or metal. A similar sawhorse construction using metal would not provide the necessary friction holding ability when the upper portions 16 of the legs are pushed into the recesses of the cross beam. While wood may provide the proper resilience, it may have a tendency to split in the area of the tight wedge fit. Plastic material is less likely to split under these conditions than wood.

The result is a structure in which the legs do not become easily disengaged from the beam if the sawhorse is picked up and moved about. The fit of the legs into the recesses holds fast without any bolts, screws or clamps.

EXAMPLE

A sawhorse has been injection molded with a commercially available foamed copolymer polypropylene material. The cross beam has a length of 23 inches and a cross section of approximately 2 inches by 4 inches. Five recesses are provided in the underside of the cross beam. The cross beam shell is about ¼ inch thick and each partition is about ¼ inch thick. The partitions are spaced about 4 inches apart. Each leg has an overall length of about 28½ inches. When assembled the lower portion of each leg extends at an angle of about 16° to the vertical and has a cross section of 1¼ inches by 4 inches. The lower leg shell measures about ⅛ inch thick and the diagonal struts measure about ⅛ inch thick. The width of the upper leg portion 16 is a little less than 4 inches, and the thickness tapers from about ¾ inch at the level of the shoulder to about ⅝ inch at the top to form the wedge shape. The braces are 3/16 inch diameter steel rods.

When assembled, a sawhorse made according to the above stands about 28 inches high and 23 inches long. The overall spread of each pair of legs at the floor is about 15 inches. A pair of these sawhorses can safely be used with working loads of 1,000 pounds.

A sawhorse as described can be knocked down and stored in a space measuring only 4 inches by 8 inches by 28½ inches. The weight of the sawhorse is less than 6 pounds.

Those skilled in the art will appreciate that other moldable plastic materials and resin-bonded materials, such as resin-bonded fiber glass and resin-bonded wood chips can be employed, the selection depending largely on weight and strength requirements and economic factors. It is not necessary that the same plastic be used for the cross beam and the legs, successful sawhorses having been constructed with cross beams molded from a structural foam plastic and the legs molded from a solid plastic. Also, various changes and modifications can be made in the preferred forms of the invention without departing from the spirit and scope of the invention. The essential characteristics of the invention are defined in the appended claims.

I claim:

1. A supporting device comprising a hollow, integrally molded cross beam having horizontal end portions open at the under side thereof, at least the end portions of said beam having vertical side walls and vertical members extending transversely between said side walls, said vertical members and said side walls defining vertical recesses open at the under side thereof, there being at least one such recess in each end portion of the beam, and at least two pairs of separately formed integrally molded legs, each leg having an upper portion and a lower portion extending at an obtuse angle from said upper portion, the dimensions of the upper portions of said legs being such that when the upper portions of two legs are juxtaposed and in contact with the lower portions thereof diverging from each other, the said juxtaposed upper end portions will fit closely within one of said vertical recesses with the outer surfaces of said juxtaposed legs in frictional engagement with inner surfaces of the recesses in said beam, an outer surface of the upper portion of each of said legs and an adjacent inner surface of each recess having interfitting parts for removably securing said legs in said recesses against accidental displacement therefrom without requiring any separate fastening devices.

2. A supporting device according to claim 1 wherein the hollow cross beam is horizontal throughout its length.

3. A supporting device according to claim 1 wherein the cross beam has a downwardly extending V-shaped portion between the end portions thereof whereby said supporting device is enabled to function as a sawbuck.

4. A supporting device according to claim 3 wherein the end portions of the beam project beyond the recesses in which the legs are disposed.

5. A supporting device according to claim 4 in which the projecting parts of said end portions are provided with means for securing another member to the supporting device.

6. A supporting device in accordance with claim 5 having in combination therewith, a horizontal, integrally molded clamping member, said clamping member having in the end portions thereof means adapted to be engaged by securing means carried in the end portions of said cross beam whereby said clamping member can be supported above said cross beam.

7. Apparatus according to claim 6 wherein the securing means for securing the clamping member to the cross beam comprises equally spaced vertically extending aligned openings in said cross beam and said clamping member and an elongated vertical member at each end of the supporting device frictionally engaged within the aligned openings in the end portions of said cross beam and said clamping member.

8. A sawhorse according to claim 1 wherein the cross beam and legs are integrally molded from a plastic material.

9. A sawhorse according to claim 8 wherein said cross beam is molded from a structural foam polyolefin.

10. A supporting device according to claim 1 wherein the lower portions of said legs are provided with aligned openings adapted to receive longitudinally disposed members adapted to support a shelf beneath the cross beam.

11. A supporting device comprising a hollow, integrally molded cross beam having horizontal end portions open at the under side thereof, at least the end portions of said beam having vertical side walls and vertical members extending transversely between said side walls, said vertical members and said side walls defining vertical recesses open at the under sides thereof, there being at least one such recess in each end portion of the beam, and at least two pairs of hollow, separately formed integrally molded legs, each leg having an upper portion and a lower portion extending at an obtuse angle from said upper portion, the dimensions of the upper portions of said legs being such that when the upper portions of two legs are juxtaposed with the lower portions thereof diverging from each other, the said juxtaposed upper end portions will fit closely within one of said vertical recesses with the outer surfaces of said juxtaposed legs in frictional engagement with inner surfaces of the recesses in said beam, the upper portions of said legs having flat outer surfaces and flat side walls extending therefrom, the inner surfaces of said upper portions being provided with generally longitudinally extending reinforcing webs, the inner surfaces of said side walls and said reinforcing webs of each leg of a pair engaging and supporting each other when two legs are assembled to form a pair, an outer surface of the upper portion of each of said legs and an adjacent inner surface of each recess having interfitting parts for removably securing said legs in said recesses against accidental displacement therefrom without requiring any separate fastening devices.

12. A supporting device according to claim 11 in which the interfitting parts for securing said legs in said recesses comprise an indentation on an outer surface of each leg and a projection correspondingly positioned on an inner surface of a side wall of the recess in which a pair of legs is disposed so that the projections on the walls of the recess engage within the indentations in the outer surfaces of the legs, the indentations on the upper portions of the legs being aligned with a supporting web within the upper portion whereby the surface surrounding the indentation is provided with support.

13. A supporting device according to claim 11 wherein the hollow cross beam is horizontal throughout its length.

14. A supporting device according to claim 11 wherein the cross beam has a downwardly extending V-shaped portion between the end portions thereof whereby said supporting device is enabled to function as a sawbuck.

15. A supporting device according to claim 14 wherein the end portions of the beam project beyond the recesses in which the legs are disposed.

16. A supporting device according to claim 15 in which the projecting parts of said end portions are provided with means for securing another member to the supporting device.

17. A supporting device in accordance with claim 16 having in combination therewith, a horizontal, integrally molded clamping member, said clamping member having in the end portions thereof means adapted to be engaged by securing means carried in the end portions of said cross beam whereby said clamping member can be supported above said cross beam.

18. Apparatus according to claim 17 wherein the securing means for securing the clamping member to the cross beam comprises equally spaced vertically extending aligned openings in said cross beam and said clamping member and an elongated vertical member at each end of the supporting device frictionally engaged within the aligned openings in the end portions of said cross beam and said clamping member.

19. A sawhorse according to claim 11 wherein the cross beam and legs are integrally molded from a plastic material.

20. A sawhorse according to claim 19 wherein said cross beam is molded from a structural foam polyolefin.

21. A supporting device according to claim 11 wherein the lower portions of said legs are provided with aligned openings adapted to receive longitudinally disposed members adapted to support a shelf beneath the cross beam.

22. A supporting device adapted to be supported on an underlying surface, said device comprising a hollow, integrally molded cross beam having horizontal end portions open at the under side thereof, at least the end portions of said beam having vertical side walls and vertical members extending transversely between said side walls, said vertical members and said side walls defining vertical recesses open at the under sides thereof, there being at least one such recess in each end portion of the beam, and at least two pairs of separately formed integrally molded legs, each leg having an upper portion and a lower portion extending at an obtuse angle from said upper portion, the dimensions of the upper portions of said legs being such that when the upper portions of two legs are juxtaposed with the lower portions thereof diverging from each other, the said juxtaposed upper end portions will fit closely within one of said vertical recesses with outer surfaces of said juxtaposed legs in frictional engagement with inner surfaces of the recesses in said beam, the upper portions of said legs having flat outer surfaces and flat side walls extending therefrom, the inner surfaces of said upper portions being provided with vertically extending reinforcing webs, the inner surfaces of said side walls and said reinforcing webs of each leg of a pair engaging and supporting each other when two legs are assembled to form a pair, the lower portions of said legs having continuous outer surfaces and inwardly extending side flanges, the outer surfaces of said legs being slightly concave longitudinally of the legs whereby the legs bow inwardly toward each other and the amount of inward deflection of the legs increases as the load on the device increases.

23. A supporting device according to claim 22 wherein the lower end surfaces of the legs extend substantially at right angles to the longitudinal axis of the legs, whereby the lower inside edges of the end portions engage the underlying surface when the device is in use.

24. A sawbuck comprising a hollow, integrally molded cross beam having horizontal end portions and a downwardly extending V-shaped portion between the end portions, the end portions of said beam having vertical side walls and vertical members extending transversely between said side walls, said vertical members and said side walls defining vertical recesses open at the under sides thereof, there being at least one such recess in each end portion of the beam, and at least two pairs of separately formed integrally molded legs, each leg having an upper portion and a lower portion extending at an obtuse angle from said upper portion, the dimensions of the upper portions of said legs being such that when the upper portions of two legs are juxtaposed and in contact with the lower portions thereof diverging from each other, the said juxtaposed upper end portions will fit closely within one of said vertical recesses with outer surfaces of said juxtaposed legs in frictional engagement with inner surfaces of the recesses in said beam.

25. A sawbuck according to claim 24 wherein the upper surface of said V-shaped portion is serrated to provide improved frictional engagement with a workpiece supported thereon.

26. A sawbuck according to claim 24 wherein the end portions of the beam project beyond the recesses in which the legs are disposed.

27. A sawbuck according to claim 26 in which the projecting parts of said end portions are provided with means for securing another member to the supporting device.

28. A sawbuck in accordance with claim 27 having in combination therewith, a horizontal, integrally molded clamping member, said clamping member having in the end portions thereof means adapted to be engaged by securing means carried in the end portions of said cross beam whereby said clamping member can be supported above said cross beam.

29. A sawbuck according to claim 28 wherein the securing means for securing the clamping member to the cross beam comprises equally spaced vertically extending aligned openings in said cross beam and said clamping member and an elongated vertical member at each end of the sawbuck frictionally engaged within the aligned openings in the end portions of said cross beam and said clamping member.

30. A sawbuck according to claim 24 in which said legs are hollow, the upper portions of said legs having flat outer surfaces and flat side walls extending therefrom, the inner surfaces of said upper portions being provided with generally longitudinally extending reinforcing webs, the inner surfaces of said side walls and said reinforcing webs of each leg of a pair engaging and supporting each other when two legs are assembled to form a pair.

31. A sawbuck according to claim 30 in which the interfitting parts for securing said legs in said recesses comprise an indentation on an outer surface of each leg and a projection correspondingly positioned on an inner surface of a side wall of the recess in which a pair of legs is disposed so that the projections on the walls of the recess engage within the indentations in the outer surfaces of the legs, the indentations on the upper portions of the legs being aligned with a supporting web within the upper portion whereby the surface surrounding the indentation is provided with support.

32. A strong lightweight sawhorse or the like, which is made from a structurally-rigid moldable material, and which can be readily assembled and then disassembled for convenient storage, comprising an integrally-molded cross beam having recess means formed at each end thereof, the recess means being accessible from the underside of the cross beam, at least two pairs of integrally-molded legs, each leg having respective upper and lower portions, the respective upper portions of a pair of legs being held in substantial abutting relationship to each other, and received into a respective recess means within the cross beam and being retained therein, whereby the legs will not fall out of the cross beam when the sawhorse is lifted, and whereby the legs may be quickly disassembled, manually, from the cross beam, the respective legs of a pair of legs being disposed at an acute angle with respect to each other, and projecting at an obtuse angle with respect to the cross beam, each leg having an outer wall and being substantially hollow along its length, and each leg having intetegrally-molded reinforcing struts within its hollow length, the lower portion of each leg having an open slot formed in its outer wall, the slot intersecting at least one of the reinforcing struts, whereby the slot is divided into a major portion and a minor portion, bracing means bridging the respective lower portions of each pair of legs, thereby preventing the legs from spreading apart when a heavy load is placed upon the cross beam, the bracing means having hook means formed on each end thereof, the width of the hook means being less than the major portion of the slot in the outer wall of each leg, whereby the hook means may be manually passed through the slot from the direction of the hollow portion of the respective leg, and whereby the hook means may then be lowered slightly and pulled in an opposite direction towards the hollow portion of the leg, the end of the hook means being thereby seated within the minor portion of the slot in the outer wall of the leg, whereby the bracing means may be quickly assembled and disassembled to a pair of legs, whereby the intersection between the slot and at least one of the reinforcing struts provides sufficient material and strength to prevent the bracing means from pulling out of the wall in the leg, and whereby the bracing means tends to self lock if the sawhorse is temporarily moved or jarred.

33. The sawhorse of claim 32, wherein the reinforcing struts are disposed diagonally with respect to the leg, and wherein the slot in the leg to receive the hook means intersects a pair of diagonally-disposed struts forming an "X" therebetween.

34. The sawhorse of claim 32, wherein the bracing means comprises a substantially-rigid wire rod.

35. The sawhorse of claim 32, wherein all of the legs are identical.

36. The sawhorse of claim 35, wherein the cross beam and the two pairs of legs are integrally molded from a suitable structural foam plastic material.

37. A strong lightweight sawhorse or the like, comprising a cross beam and four legs, each of the legs being identical, and the cross beam and the legs being molded from a suitable substantially-rigid plastic material, quick-connection means between the cross beam and the legs, and quick-connection cross bracing means joining the respective lower portions of each pair of legs, whereby the sawhorse may be quickly assembled and erected at the job site, and whereby the sawhorse may be quickly disassembled for convenient storage, the legs in the erected position of the sawhorse projecting at an acute angle with respect to each other and at an obtuse angle with respect to the cross beam, and each of the identical legs having an end wall disposed at an acute angle with respect to the floor or other supporting surface, the end wall having a longitudinal edge thereof disposed in engagement with the floor, the longitudinal edge being concave with respect to the floor, whereby the corners of the end wall at its longitudinal edge rest upon the floor, thereby preventing inadvertent movement or skidding and thereby providing a substantially stable sawhorse.

* * * * *

UNITED STATES PATENT AND TRADEMARK OFFICE

CERTIFICATE OF CORRECTION

PATENT NO. : 4,124,093

DATED : November 7, 1978

INVENTOR(S) : John H. Breisch

It is certified that error appears in the above-identified patent and that said Letters Patent are hereby corrected as shown below:

Column 2, line 21, change "under" to --undue--

Column 5, line 17, change "12" to --32-- line 39, change "directly" to --safely--

Column 7, line 21, change "further" to --farther--

Signed and Sealed this

*Twentieth* Day of *February 1979*

[SEAL]

*Attest:*

RUTH C. MASON
*Attesting Officer*

DONALD W. BANNER
*Commissioner of Patents and Trademarks*